April 30, 1935. B. A. WITTKUHNS 1,999,646
LIGHT OR RAY CONTROLLED FOLLOW-UP SYSTEM
Filed Jan. 18, 1932  2 Sheets-Sheet 1
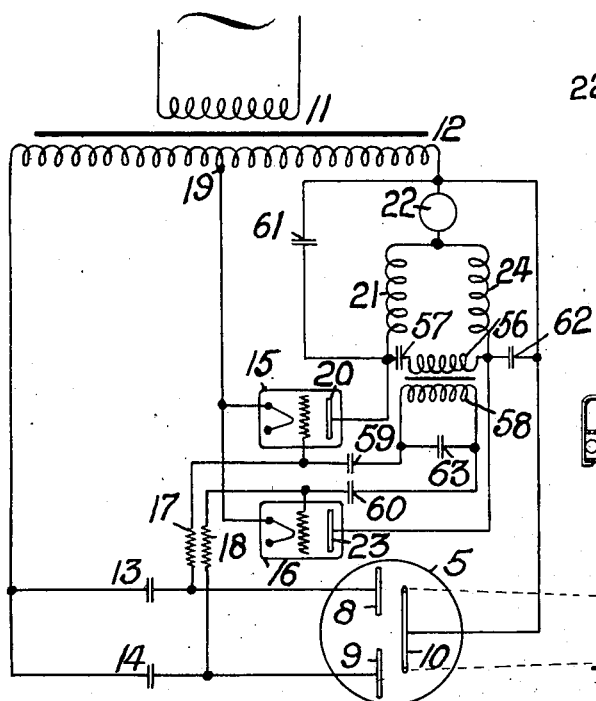
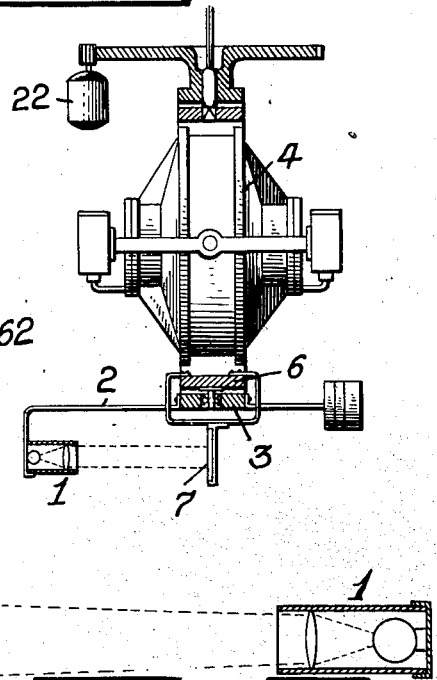
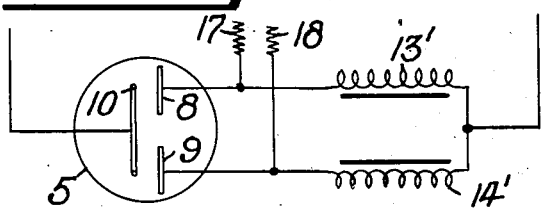
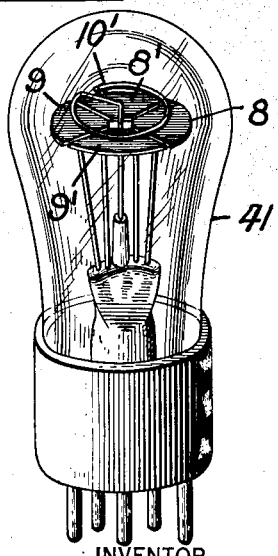
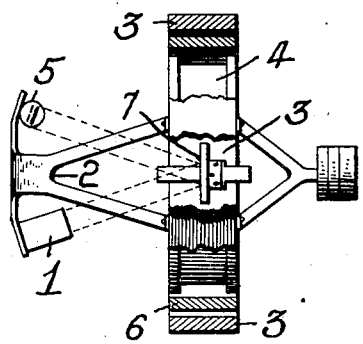
INVENTOR
BRUNO A. WITTKUHNS.
BY
Herbert H. Thompson
his ATTORNEY.

April 30, 1935.   B. A. WITTKUHNS   1,999,646
LIGHT OR RAY CONTROLLED FOLLOW-UP SYSTEM
Filed Jan. 18, 1932   2 Sheets-Sheet 2

INVENTOR
BRUNO A. WITTKUHNS.
BY
Herbert H. Thompson
his ATTORNEY.

Patented Apr. 30, 1935

1,999,646

UNITED STATES PATENT OFFICE 1,999,646

LIGHT OR RAY CONTROLLED FOLLOW-UP SYSTEM

Bruno A. Wittkuhns, Summit, N. J., assignor to Sperry Gyroscope Company, Inc., Brooklyn, N. Y., a corporation of New York Application January 18, 1932, Serial No. 587,273

6 Claims. (Cl. 250—41.5)

This invention relates to remote control or follow-up systems for sensitive devices on which no load should be placed and which, therefore, should not be loaded with any type of mechanical or electrical transmitter involving the slightest torque or friction. It has been proposed in this connection to employ a light source in combination with a light sensitive surface or photo-electric cell. Such a means satisfies the requirements but has never come into extensive use because enough power has never been obtained from a photo-electric cell to actuate a servo or follow-up motor direct. An improved method of operating a follow-up motor from a photo-electric cell is described in my Patent 1,976,648 issued October 9, 1934, for Remote control systems. By my present invention I effect an important improvement over my prior invention in that I am enabled to use an ordinary reversible direct current motor as the follow-up motor and drive it directly from the output of a pair of grid-controlled gas or vapor filled tubes, which in turn are governed by photo-electric cells. By utilizing a photo-electric cell to shift the phase on the grids of the aforesaid tubes, I am enabled to drive the motor in either direction desired at a speed proportional to the displacement between the two to cause the follow-up element to coincide in position with the sensitive element.

Referring to the drawings showing several forms of my invention,

Fig. 1 shows how my invention may be applied to the driving of the follow-up element of a gyro compass.

Fig. 2 is a simplified wiring diagram of my invention.

Fig. 3 shows a modification in the method of securing the shifting of the phase on the grid of the grid-controlled tubes from the photo-electric cell.

Fig. 4 is a bottom plan view of Fig. 1, the follow-up and vertical ring being shown in section.

Fig. 5 is a perspective view of the form of photo-electric cell preferred for controlling follow-up systems in more than one plane.

Figure 7:
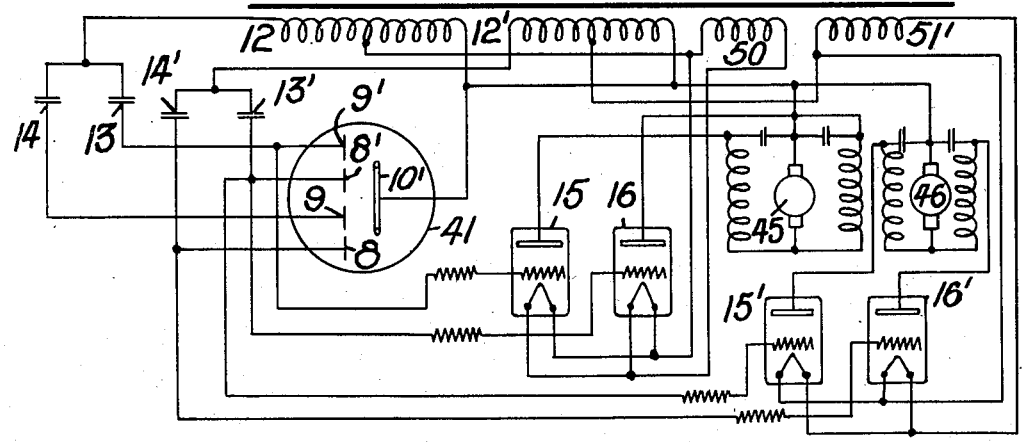
Fig. 7 is a wiring diagram of Fig. 6.

As applied to a follow-up system of a gyro compass I have shown in Fig. 1 a light source 1 mounted on a bracket 2 secured to the follow-up ring 3 of the gyro compass 4. I may also mount on said bracket 2 a photo-electric cell or cells 5 spaced horizontally from the light source 1. I then attach to some portion of the sensitive element, say the vertical ring 6, a mirror 7 so that upon relative turning of the sensitive and follow-up elements a beam of light from the light source will be shifted with respect to the photo-electric cell. If ordinary photo-electric cells are employed a pair would be used, but preferably I employ a double cell 5 having a pair of light sensitive surfaces or cathodes 8 and 9 laterally spaced and a ring 10 which acts as an anode for both cathodes. Alternating current is passed through the cell from a transformer 11 of which one end of secondary 12 is connected to the anode 10 and the other end is connected to both the cathodes 8 and 9 through condensers 13 and 14.

At 15 and 16 are represented a pair of grid-controlled gas or vapor filled tubes. The grid of tube 15 is shown as connected through a high resistance 17 to plate 8, while the grid of tube 16 is shown as connected through a high resistance 18 to the cathode 9 of tube 5. For the sake of clearness, the filament circuit for these tubes is omitted but the electron circuit is secured by connecting one end of each filament to the mid point 19 of the secondary 12. The plate 20 of tube 15 is connected to a field winding 21 of the power motor 22 which may be of the ordinary commutator, D. C. type, the circuit being completed through the armature and back to secondary 12. The plate 23 of tube 16, on the other hand, is connected to opposed field winding 24 of the motor 22 and thence through the armature to the transformer as before. It will readily be apparent, therefore, if the two tubes are passing the same amount of current that the motor 22 will stand still but that the motor will rotate in one direction or the other if the output of one of the tubes predominates, dependent on which tube has the higher mean plate current.

One characteristic of this type of tube is that the output may be readily controlled, i. e., stopped, started and varied in magnitude by using an alternating current supply and by shifting the phase on the grid with respect to the phase on the plate. The tube will then only start when the plate is positive and the grid is positive (or past its critical point) but when started will continue until the plate becomes negative. By shifting the phase relations between the plate and grid potentials on each tube therefore, the mean value of the current passed by each tube may be varied gradually from zero to approximately full half wave value.

The phase on the grid of the tubes is shifted by varying the resistance between anode 10 and the two cathodes 8 and 9 of the photo-electric cell 5 which are in series with the condensers 13 and 14. Since the resistance to the passage of current within the photo-electric cells varies oppositely as the light shifts in one direction, the result is that current through one field coil 21 will increase while the current through the other coil 24 decreases. By arranging the systems so that the curernts are normally equal through two coils when the tubes are delivering about one half the maximum output, i. e., when the grids and plates are about 90° out of phase, the motor 22 will stand still since there is no field, but upon slight movement of the light beam in either direction the current in one field will predominate and start the motor to drive the follow-up system in the proper direction to restore synchronism. As is well understood in the art of gyro compasses and the like, it is advisable to maintain the follow-up support in a state of oscillation to reduce static friction. To this end, an inductive feed back coupling may be provided as by connecting the primary 56 of a transformer across the output of the tubes, with a condenser 57 in series therewith. The secondary 58 thereof I connect at opposite ends to the grids of the respective tubes through condensers 59 and 60 so as to superimpose a tremor or oscillation into the system. Tuning condensers are shown at 61, 62 and 63.

It will be readily apparent that instead of using condensers in series with the photo-electric cell to shift the phase on the grid that inductances or choke coils 13'—14' may be employed as shown in Fig. 3. In this case, however, the leads are connected oppositely to Fig. 2 since, as is well known, the phase shift, due to induction, is opposite to that due to capacity.

Figure 6:
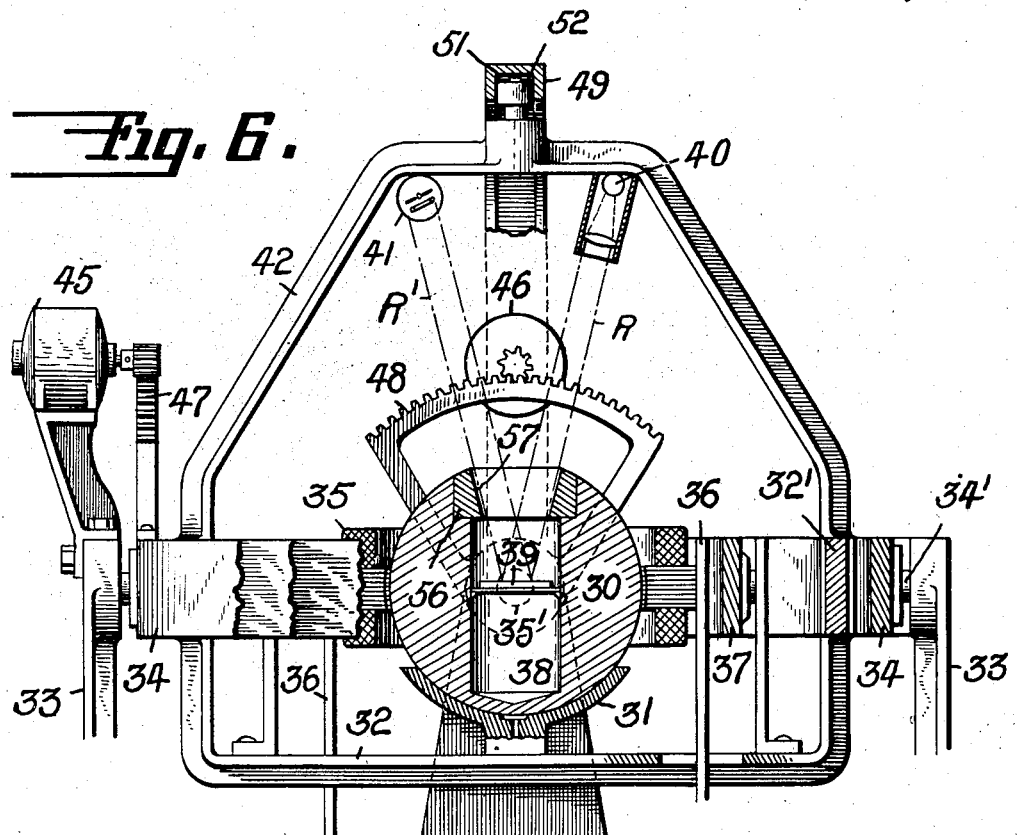
Fig. 6 is an elevation, partly in section, of a gyro vertical of the ball type showing how my follow-up system may be applied thereto about both horizontal axes.

My invention may be equally well employed to control follow-up systems in more than one plane. Fig. 6 illustrates how the invention may be employed to control the position of a platform or reference plane about both horizontal axes with respect to a gyro vertical. The gyro vertical is shown in the form of a ball 30 rotated on a self-sustaining air film in a cup 31 supported on a platform 32 having a universal mounting within upright supports 33 on outer trunnions 34' of gimbal 34 and on inner trunnions 35' within the gimbal at right angles thereto. The ball is shown as electrically spun from a stator 35 mounted within a pendulous support 36, which is independently gimbaled within the platform 32 through a gimbal ring 37.

For a more detailed description of this type of gyro vertical, reference may be had to my prior application jointly with William Anscott, Serial No. 562,282, filed September 11, 1931. The ball is shown as being hollowed out along its vertical diameter as at 38 to give it a maximum moment of inertia about its vertical axis. Within said bore or elsewhere on the vertical axis of the ball I mount a mirror 39 adapted to receive a beam of light from a light source 40 and to reflect the same on a photo-electric cell or cells 41. In order to give a sharp cut off for the beam or ray R and the reflected ray R' and also to help balance the ball, I have shown a ring 56 preferably of heavier metal than the ball and having a tapered bore 57, the wall of which lies preferably parallel to the rays R, R' and almost intersecting the outer edges of the beams. By this or similar means a maximum variation in beam intensity on the cell 41 is secured for minimum tilts. Preferably the mirror 39 is mounted at the center of the ball or sphere as shown and in the same plane as the gimbal trunnions. Both said source and cell are shown as mounted on a loop or inverted U frame 42 secured to the platform ring 32'.

In this case the photo-electric cell 41 I prefer to employ has four cathodes 8, 9, 8', 9' preferably arranged as quadrants around the center of the tube. A common anode 10' may be employed for all cathodes. If the tube is placed, therefore, with the division lines between the four cathodes parallel to the gimbal axes 34', 35' of support for platform 32, it will readily be seen that the tube may control a pair of motors 45 and 46, one about each gimbal axis.

The motor 45 is shown as geared to a large gear sector 47 on the outer gimbal ring 34, while the motor 46 is geared to a gear sector 48 connected to a bail or loop 49 pivoted on trunnions (not shown) normally in line with and outside of the trunnions 35' but journalled in independent brackets 55 on the base. Loop 42 has a sliding or rolling contact with the bail 49 about the main axis 34' of the gimbal 34, which constitutes the outer gimbal axis of the support 32', this connection being shown as in the form of a roller 52 on loop 42 engaging the U-shaped trackway 51 in the bail 49. About axis 35' the platform 32 is rigidly connected to the loop so that any torque transmitted to the loop in this plane is also transmitted to the support 32. The support 32 is thus automatically maintained in fixed relation about both axes to the axis of the ball 30.

Referring now to Fig. 7, it will be seen that the wiring in general is similar to Fig. 3 except that two motors 45 and 46 are shown in place of the single motor 22 and that duplicate circuits are provided therefor from the double duplex cathode tube 41. For simplicity, the four cathodes are shown in one plane in the diagram although they are really arranged as shown in Fig. 5. The power is supplied to the entire system from the transformer 11' as before, separate secondaries 12—12' being supplied for the two motor circuits and separate pairs of grid-controlled tubes 15—16 and 15'—16'. In this case the heating circuit for the filaments of the tubes are also shown, the current for the pair 15—16 being supplied from a third secondary coil 50 on the transformer and the heating circuit for the filaments of 15'—16' being supplied from a fourth coil 51' on the transformer.

From the foregoing the operation of my invention will be readily apparent. Whenever the position of the platform 32 departs from the horizontal, the beam of light will be moved slightly to one side or the other thus disturbing the balance of the electron flow through the gas filled tubes and varying the amount of current passing through the balanced circuits thus causing one field or the other of one or both motors to predominate to turn the platform into the proper position about the proper axis.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and other omitted without interfering with the more general results outlined, and the invention extends to such use.

Having described my invention, what I claim and desire to secure by Letters Patent is:

1. In a follow-up system for sensitive elements, the combination with an A. C. source, sensitive and follow-up elements and a reversible commutator motor for driving the latter, of a beam directing means on one of said elements, photo-electric devices on the other of said elements and adapted to intercept a variable amount of light from said beam as the relative position of said elements varies, a pair of grid-controlled gas-filled tubes governed by said devices, and means responsive to the varying relative resistance of said devices controlled by the relative amount of light received thereby for oppositely shifting the phase on the grids of said tubes, the rectified plate circuit of said tubes being connected to drive said motor in opposite directions.

2. In a follow-up system for sensitive elements, the combination with sensitive and follow-up elements, an A. C. source and a reversible commutator motor for driving the latter having opposed windings, a pair of grid-controlled gas-filled tubes having their plates connected to excite said opposed windings to drive the motor in opposite directions, a light source adapted to cast a beam, photo-electric cell elements normally equally illuminated by said beam, said source and beam means being so mounted in said elements that the relative amount of light intercepted by said cell elements varies upon displacement between said sensitive and follow-up elements, and means responsive to the varying resistance of said elements due to variations in the relative amount of light received by each cell for oppositely shifting the phase on the grids of said tubes upon the relative movement of the cell elements and beam.

3. In a follow-up system for sensitive elements, the combination with sensitive and follow-up elements and a reversible electric motor having opposed windings for driving the latter, a pair of grid-controlled gas-filled tubes having their plates connected to said windings to drive the motor in opposite directions, a common A. C. supply for said tubes and motor, a source of light, a photo-electric device having at least two cathodes on one of said elements, means for varying the relative amount of light received thereby on relative movement of said elements, and means connecting each of said cathodes and the grid of a tube to shift the phase thereon for oppositely varying the output of said tubes whereby said motor is driven in the proper direction to maintain the follow-up element aligned with said sensitive element.

4. In a follow-up system for stabilizing an element, the combination with the stabilizing and follow-up elements, of a four cathode photo-electric cell arrangement on said follow-up element, a beam directing means on the stabilizing element adapted to direct a beam of light on said cell, the position of the beam varying upon relative inclination of the stabilizing and follow-up elements, two pairs of electron discharge tubes controlled by the output of said cells, a reversible motor for tilting said follow-up element in one plane and controlled by one pair of cathodes through one pair of tubes, and a second reversible motor for tilting said element in another plane and controlled by the other pair of cathodes through the other pair of tubes.

5. In a follow-up system for sensitive elements, the combination with an A. C. source, sensitive and follow-up elements and a reversible motor for driving the latter, a pair of grid-controlled gas-filled tubes having their plates connected to drive the motor in opposite directions, a beam directing means on one of said elements, opposed photo-electric cell arrangements on the other of said elements and connected to oppositely vary the phase on the grids of said tubes upon relative movement of the cell arrangements and light means, and a feed-back connection between the output of said grid tubes and the input thereof for maintaining oscillation of the follow-up element.

6. In a follow-up system for sensitive elements, the combination with an A. C. source, sensitive and follow-up elements and a reversible motor for driving the latter, a pair of grid-controlled gas-filled tubes having their plates connected to drive the motor in opposite directions, a beam directing means on one of said elements, opposed photo-electric cell arrangements on the other of said elements and connected to oppositely vary the phase on the grids of said tubes upon relative movement of the cell arrangements and light means, and means for exciting a self-sustained oscillation of fixed frequency in the tube control circuit.

BRUNO A. WITTKUHNS.